Sept. 6, 1966  C. A. ADAMS  3,270,351
TOILET FLUSHING PROCESS AND APPARATUS TO RESTORE HEIGHT OF WATER
Filed Aug. 31, 1964  2 Sheets-Sheet 1

Charles A. Adams INVENTOR.
BY Bush & Beasley
His Attorneys.

Sept. 6, 1966            C. A. ADAMS            3,270,351

TOILET FLUSHING PROCESS AND APPARATUS TO RESTORE HEIGHT OF WATER

Filed Aug. 31, 1964            2 Sheets-Sheet 2

Charles A. Adams INVENTOR.

BY Bush + Bush
His Attorneys.

United States Patent Office 3,270,351
Patented Sept. 6, 1966

3,270,351
TOILET FLUSHING PROCESS AND APPARATUS TO RESTORE HEIGHT OF WATER
Charles A. Adams, 614 Taylor St., Davenport, Iowa
Filed Aug. 31, 1964, Ser. No. 393,146
17 Claims. (Cl. 4—41)

This invention relates to the combinations of a method aided by mechanical means to maintain the volume of water and to operate both air and water valves to flush indoor toilets and to replace the water to a predetermined stage after each flushing.

The objects of my invention are to provide manually operable mechanical means in a suitable tank or reservoir to maintain and replace therein an amount of water necessary to completely flush indoor toilets in common use from any and all waste matter accumulated therein.

The following is a description of a vacuum controlled water supply tank to be used for flushing toilets and to provide a simple and positive means for maintaining a supply of water in a tank. It also insures a uniform, and adequate supply of water to flush a toilet by manually triggering an air valve.

Figure 1:
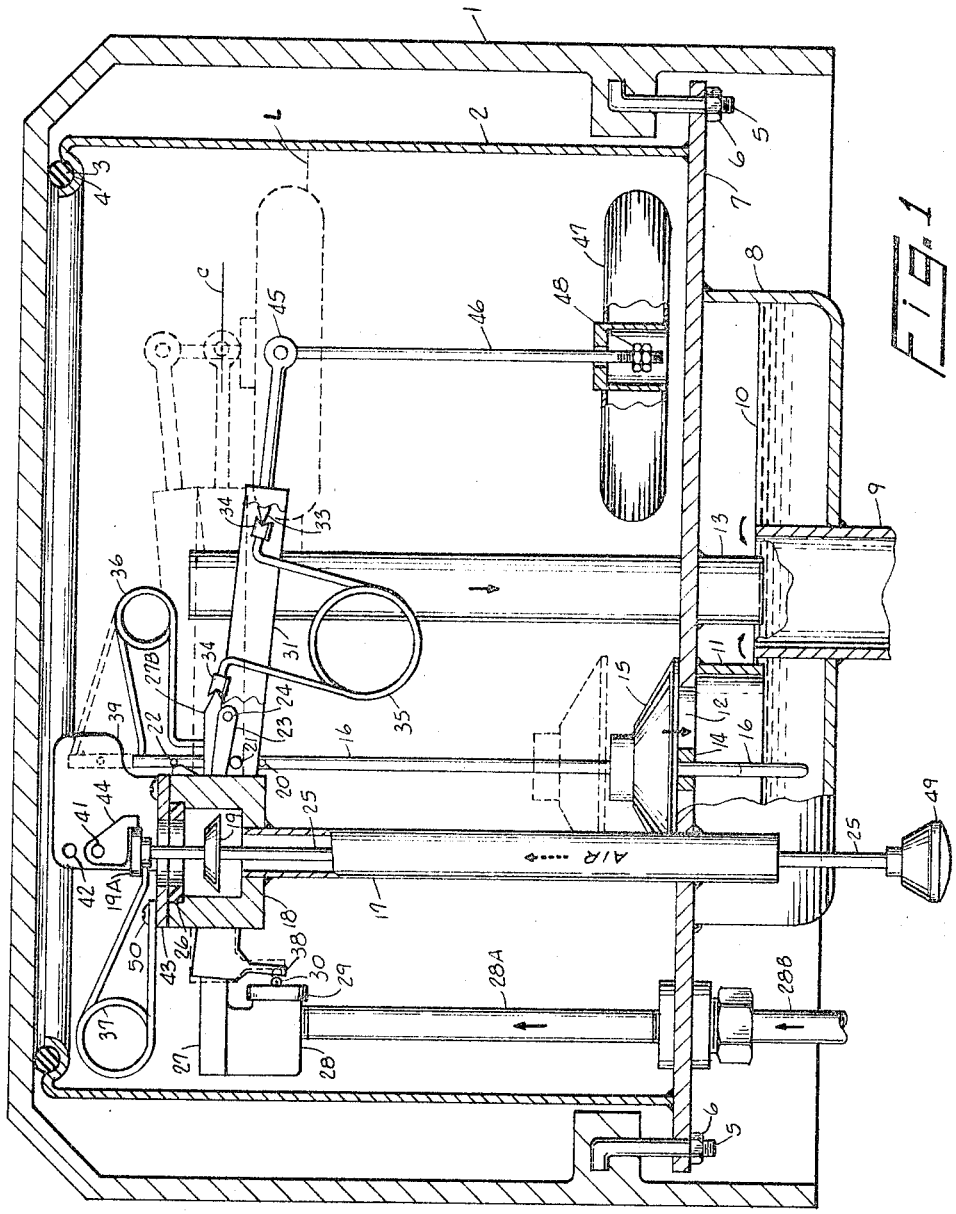

I accomplish these objects by the means shown in the accompanying drawings, in which:

FIGURE 1 is a sectional elevation of an airproof and waterproof tank or reservoir capable of holding several gallons of water but with the near sides of both housing and tank omitted and showing apparatus therein partly in section.

Figure 2:
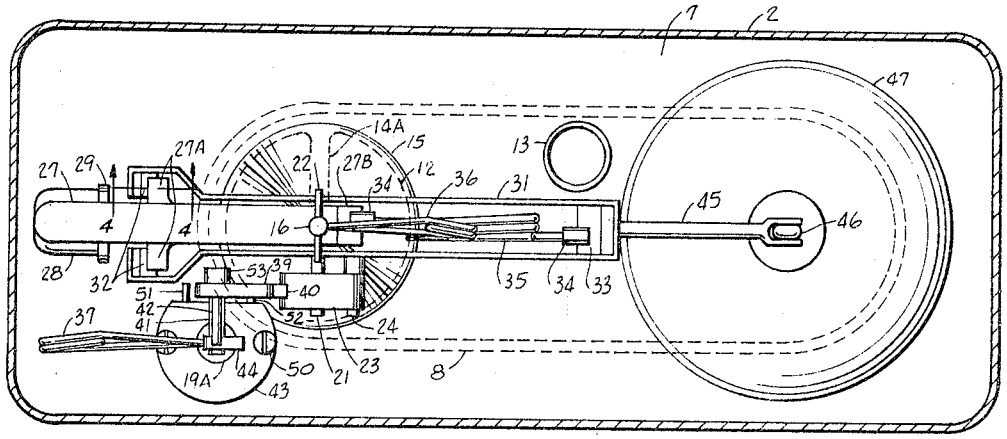

FIGURE 2 is a fractional plan view of the tank 2 holding a part of the base 7 and a plan or top view of the appliances in the upper part of the tank 2 shown in FIGURE 1.

Figure 3:
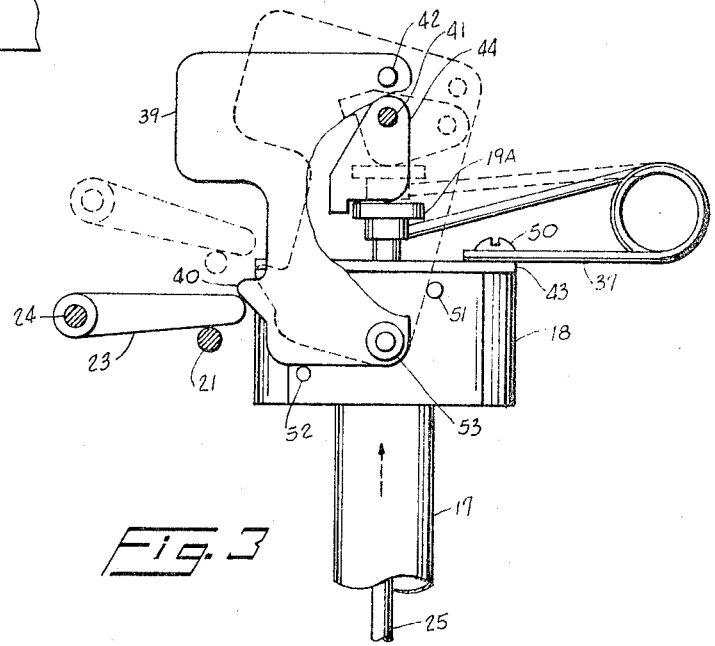

FIGURE 3 is an enlarged detail view with portions removed taken from the opposite side of FIGURE 1 of the air valve body 18, toggle bar 31, and bell crank 39.

Figure 4:
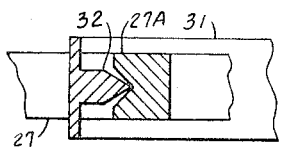

FIG. 4 is an enlarged sectional view taken substantially along the line 4—4 of FIG. 2.

In FIGURE 1, 1 is a cover for the tank 2. 3 is a continuous gasket in groove 4 around the top edge of the tank 2. When the bolts 5, which are anchored in the cover 1, are drawn down by nuts 6, the top of tank 2 is hermetically sealed.

The plate 7 is the bottom plate of the tank 2. An airtrap 8, which is of great importance to the success of this device, is welded to and depends from the bottom of plate 7. The components of the trap 8 are as follows: a water outlet 9 to the toilet extends through the bottom of and is welded to the trap 8. It also serves as a standpipe to maintain a water level 10 in the trap 8.

A circular air baffle wall 11 is also welded to the bottom of the plate 7 and surrounds a water check valve opening 12 in the plate 7. The baffle 11 extends slightly below the water level 10. A tube 13 also passes through and is welded to the plate 7 and also extends slightly below the water level 10 thereby creating an air trap, which makes it possible to hold water in the tank 2 by vacuum means, when the air valve 19 is closed and the water check valve 15 is opened simultaneously, as in dotted lines.

In FIGURE 1 number 14 is a spider guide for the valve stem 16. In FIGURE 2, 14A is one of the supporting arms of the spider guide 14. The tube 13 also extends upward from 7 to a point sufficiently above the approximate water level L, and is below the opening in the air valve body 18, so that the tube 13 serves as a safety water overflow down into the trap 8 and subsequently into the outlet 9. An overflow would only occur in case of a malfunction of the float or any of the valves in the system.

17 is a tube welded to and extending downward through the plate 7 into the atmosphere. The upper end of the tube 17 is secured to the air inlet valve body 18, whereby air may be admitted to the tank 2 by opening the valve 19 by manual means, thereby interrupting the vacuum and releasing the water to flush the toilet.

The pipe 28A is the water service inlet pipe to the valve 28. 29 is a packing nut for rubber valve seat washer in 28. 27 is an extension of 28. The fulcrum seats 27A and fulcrum 27B are parts of extension arm 27.

The action of the moving parts, to complete a cycle in the system, are explained, as follows: The spring 35, bearing seats 34 and fulcrums 33 and 27B furnish longitudinal pressure on toggle bar 31 to force it up or down past the center line C.

In FIGURE 1 water has left tank 2, float 47 has engaged adjusting nuts 48 on rod 46 pulling lever 45, which is a part of toggle bar 31, down past the center line C. The valve stem 16 was permitted to drop, closing the check valve 15. The toggle bar 31 presses downward on hold down pin 20 to securely hold the valve 15 closed. At the same time, the lever 38, which is a part of the bar 31, will open the water service inlet valve 28 by pressing on extension 30, which is part of water service inlet valve 28. The tank 2 will now fill with water. In so doing the float 47 will contact the lever 45 forcing it upward until 45 is at C in dotted lines. The water check valve 15 will remain closed under the weight of the water until the combined energy of the float 47 and the spring 35 will force the toggle bar 31 into upper position, as indicated by dotted lines. At the same time the ratchet pawl 23, rotatably mounted on the stud 24 and resting on the pin 21, will contact the lug 40, which is part of the bell crank 39. The bell crank 39 will then rotate counter-clockwise on FIGURE 1 and clockwise on FIGURE 3 on stud 53 sufficiently to trip escape pawl 44, as indicated by dotted lines in FIGURE 3. Since pawl 44 has been removed from its holding position on flange 19A, which is a part of air valve 19, the spring 37 can now lift the valve 19 into a closed position seated in the rubber washer 26 under the plate 43. Also while the toggle bar 31 is moving upward at C (center line) it contacts the lift pin 22 in the valve stem 16. Once the valve 15 starts to lift, the weight of the water will be overcome and the spring 35 can force the bar 31 into upper position. The spring 36, one end seated in the hole in 27B and the other end passing through a hole in the valve stem 16, in FIGURE 3, is now free to lift the valve stem 16 until hold down pin 20 is held against the bottom of the bar 31 until 31 is moved into its upper position, thereby causing the valve 15 to lift a height equal to the full travel of the bar 31. Also spring 36 causes a delayed action preventing valve 15 from closing before bar 31 is well below center line C, and valve 28 has opened.

The tank 2 is now full of water. The water service valve 28 is closed since lever 38 has moved away from valve extension 30. The air valve 19 is closed, the water check valve 15 is open and the water is being retained in the tank 2 by vacuum.

The bell crank 39 is supported rotatably off-center on the stud 53, so that its own weight will return it to rest upon the pin 52 after it has been triggered by the pawl 23 forcing upward on the lug 40 on the bell crank 39.

51 is a stop pin to keep the bell crank 39 from rotating too far. 42 is a stop pin to limit rotation of escapement pawl 44. The pawl 23 is shown in dotted lines, after it has triggered the bell crank 39.

At this point the tank 2 has been filled with water to the required amount and the water is being suspended by vacuum. This has all been accomplished by mechanical means. When it is desired to flush the toilet, downward manual pressure is applied to the knob 49 acting on the air valve stem 25 to open the air valve 19. The flange 19A is also in down position as shown in full lines.

The escapement pawl 44, which is rotatably supported on the pin 41 on the bell crank 39, can now fall into holding position on the flange 19A by its own weight as shown, thus breaking the vacuum. Water will now pass down through the opening 12 into the trap 8 and on out to outlet 9 into the toilet. This completes the cycle.

Various modifications may be made in details without departing from the spirit of my invention as described and claimed and I do not limit my claims to the precise form shown in the drawings.

I claim:

1. In cooperation with a vacuum controlled water storage tank, a water outlet in communication with a toilet bowl, a temporary water check valve for the outlet, a water service inlet valve, mechanical means adapted in one movement to lift the check valve to unseat it from the outlet and to close the service valve and in second movement to reseat the outlet valve and open the service valve, and a lost motion action in the mechanical means effective to delay reseating the check valve until after the service valve has opened.

2. In a vacuum controlled system for a water storage tank for flushing toilets; an air inlet for relieving the vacuum; an air valve for the inlet; a spring for biasing the valve in a closed position; a bell crank supported in the tank; mechanical means for adjusting the bell crank; an adjustment pawl pivoted on the bell crank and engageable with the valve for holding the valve in an open position; and manual means for moving the valve to an open position to permit the pawl to engage and retain the valve open.

3. The invention defined in claim 2 in which the mechanical means includes a float and is adapted to swing the bell crank as the water level rises to thereby disengage the pawl from the valve.

4. The invention defined in claim 2 in which the bell crank is overbalanced in one direction to return it to a position whereby the pawl may engage the valve upon it being manually opened.

5. In an appliance for flushing a toilet, the combination with a reservoir secured and hermetically sealed to the bottom of a vacuum controlled water storage tank, an air trap having a water outlet pipe with its lower end extending downward through and secured and sealed to the bottom of the trap and the other end extending upward to approximately one-half the depth of the trap serving as a standpipe to maintain a constant water level in the trap, combined with a baffle wall secured to and sealed to the under side of the tank floor, said baffle wall surrounding the water outlet in the floor of the tank and extending downward slightly below, the water level in the trap.

6. In apparatus for flushing a toilet, a hermetically sealed vacuum controlled water storage tank, a float suspended on the surface of the water, a temporary water check valve, and mechanical means responsive to lowering of the float for closing the check valve and opening a service water inlet valve simultaneously when the tank is empty, the mechanical means being responsive to raising of the float opening the temporary water check valve, closing the service water inlet valve, and closing an air vent valve simultaneously after the tank is filled, and an air intake and manual means for opening it, adapted to interrupt the vacuum when it is desired to release the water to flush a toilet 7. In cooperation with a hermetically sealed vacuum controlled water storage tank for flushing toilets an air trap comprising a reservoir secured and hermetically sealed to the bottom of the vacuum controlled water storage tank, the air trap having a water outlet pipe with its lower end extending downward through and secured and sealed to the bottom of the trap and the other end extending upwardly into the trap and serving as a standpipe to create a constant water level in the trap, combined with a baffle wall secured to and sealed to the under side of the tank floor, said baffle wall surrounding the water outlet in the floor of the tank and extending downward slightly below the water level in the trap.

8. In cooperation with a vacuum controlled water storage tank, an air trap as described in claim 7 located at the base of said tank and including a safety water overflow pipe.

9. The invention defined in claim 7 further characterized by a fluid conduit affording communication between the trap and tank between an upper end opening into the upper portion of the tank and a lower end opening into the trap beneath the normal level of the water within the trap to thereby serve as an overflow pipe for the tank.

10. In cooperation with a hermetically sealed vacuum controlled water storage tank for flushing toilets, an air trap consisting of a reservoir secured and hermetically sealed to the under side of the bottom of the tank, said reservoir having a water outlet pipe passing through and sealed in the bottom of it, the lower end of the pipe extending downward and serving as an outlet to a toilet, the upper end extending upward equal to approximately one-half of the depth of the reservoir and serving as a standpipe to maintain a constant water level in the reservoir, and also having a circular air baffle wall secured and hermetically sealed to the bottom of the tank, said baffle surrounding a water outlet in the bottom of the tank, and extending downward slightly below the water level in the trap; a pipe passing through said trap, secured to and sealed in the bottom of the tank, with its lower end extending slightly below the water level in the trap and the upper end extending upward to a point above the normal water level in the tank, and serving as a safety water overflow.

11. In cooperation with a hermetically sealed vacuum controlled water storage tank for flushing toilets, an air trap consisting of a reservoir secured and hermetically sealed to the under side of the bottom of the tank, said reservoir having a water outlet pipe passing through and sealed in the bottom of it, the lower end of the pipe extending downward and serving as an outlet to a toilet, with the upper end of the pipe extending upwardly into the reservoir and serving as a standpipe to maintain a constant water level in the reservoir; an air baffle wall secured and hermetically sealed to the bottom of the tank, said baffle wall surrounding a water outlet in the bottom of the tank, and extending downward slightly below the water level in the trap; a pipe passing through, secured to and sealed in the bottom of the tank, with its lower end extending slightly below the water level in the trap and the upper end extending upward to a point above the normal water level in the tank and serving as a safety water overflow.

12. For use with a toilet stool, the combination of a hermetically sealed water storage tank having a base outlet in communication with the toilet stool, and a service water inlet; an inlet valve for the water inlet and an outlet valve for the outlet; float means within the tank; an air passage opening to the top of the tank; means operatively responsive to raising of the float means to a predetermined level to close the air passage to thereby effect a vacuum at the top of the tank; means between the float means and inlet and outlet valves for opening the outlet valve and closing the inlet valve as the water level approaches the aforesaid predetermined level and to close the outlet valve and open the inlet valve as the water level drops to the base of the tank; and manual means external of the tank for opening the air passage to relieve the vacuum in the top of the tank.

13. For use with a toilet stool, the combination of a hermetically sealed water storage tank having a base outlet and a service water inlet; float means within the tank; an air inlet in the top of the tank; means operatively responsive to raising of the float means to a predetermined level to close the air inlet to thereby effect a vacuum at the top of the tank; means between the float means and inlet and outlet respectively for opening the outlet and closing the service inlet when the water level is substantially at the aforesaid predetermined level and to close the outlet and open the service inlet as the water level drops to the base of the tank; and manual means external of the tank for relieving the vacuum in the top of the tank.

14. For use with a toilet stool, the combination of a hermetically sealed water storage tank having a base outlet and a service water inlet; float means within the tank; an air inlet in the top of the tank; means operatively responsive to raising of the float means to a predetermined level to close the air inlet to thereby effect a vacuum at the top of the tank; means between the float means and service inlet and outlet respectively for opening the outlet and closing the service inlet when the water level is substantially at the aforesaid predetermined level and to close the outlet and open the service inlet as the water level drops to the base of the tank; manual means external of the tank for relieving the vacuum in the top of the tank; an air trap at the base of and hermetically sealed to the tank, and in fluid communication with the tank via the outlet; a water pipe having an upper intake end opening into the trap above the outlet from the tank so as to maintain a normal water level in the trap; and a fluid conduit opening into the trap below the normal level of water therein and into the tank above the aforesaid predetermined level.

15. The combination of a hermetically sealed water storage tank having a base outlet in communication with a toilet stool, a service inlet, and an air inlet means at the top of the tank; an inlet valve for the water inlet; an air valve for the air inlet means; a water outlet; an outlet valve for the outlet; a lever supported for vertical movement in the tank; a float on the lever for vertically adjusting the lever in accordance with the level of the water; an operative connection between the lever and water inlet valve for opening the valve upon the water level being at its lower level closely adjacent the base of the tank and to close the valve upon the water approaching a normal water level adjacent the top of the tank; a connection between the air inlet valve and lever responsive to close the valve upon the water approaching the normal water level to thereby create a vacuum above the water; a connection between the outlet valve and lever responsive to open the valve upon the water being at its normal level and to close the valve upon the water reaching the lower level; and manual means for opening the air inlet means.

16. For use with a toilet stool, the combination of a hermetically sealed water storage tank having a base outlet and service water inlet; mechanical means in the tank that are self adjustable in response to raising and lowering of the water level; an air inlet in the top of the tank; a connection to the mechanical means responsive to raising of the water level to a predetermined level to close the air inlet to thereby effect a vacuum at the top of the tank; means between the mechanical means and service inlet and outlet respectively for opening the outlet and closing the service inlet when the water level is substantially at the aforesaid predetermined level and to close the outlet and open the service inlet as the water level dorps to the base of the tank; manual means external of the tank for relieving the vacuum in the top of the tank; an air trap at the base of and hermetically sealed to the tank, and in fluid communication with the tank via the outlet; and a water pipe having an upper intake end opening into the trap above the outlet from the tank so as to maintain a normal water level in the trap.

17. In cooperation with a vacuum controlled water storage tank, a water outlet in communication with a toilet bowl, a temporary water check valve for the outlet, a water service inlet valve, mechanical means adapted in one movement to lift the check valve to unseat it from the outlet and to close the service valve, and in a second movement to reseat the outlet valve and open the service valve, and a spring operatively engaging the water check valve and effective to delay reseating of the check valve until after the service valve has opened.

References Cited by the Examiner
UNITED STATES PATENTS

| | | | |
|---|---|---|---|
| 909,638 | 1/1909 | Morgan | 4—19 |
| 961,458 | 6/1910 | Morgan | 4—19 |

FOREIGN PATENTS 381,698  10/1932  Great Britain.

LAVERNE D. GEIGER, *Primary Examiner.*

H. K. ARTIS, *Assistant Examiner.*